United States Patent [19]

Yelland

[11] 4,238,400
[45] Dec. 9, 1980

[54] ANTHRAQUINONE DYES

[75] Inventor: Michael Yelland, Manchester, England

[73] Assignee: Imperial Chemical Industries Limited, London, England

[21] Appl. No.: 41,259

[22] Filed: May 21, 1979

[30] Foreign Application Priority Data

Jul. 7, 1978 [GB] United Kingdom ............... 29229/78

[51] Int. Cl.$^3$ ......................................... C07C 143/665
[52] U.S. Cl. .................................................... 260/372
[58] Field of Search ........................................ 260/372

[56] References Cited

U.S. PATENT DOCUMENTS

| 1,902,084 | 3/1933 | Kraenzlein et al. | 260/372 |
| 2,117,476 | 5/1938 | Hulton et al. | 260/372 |
| 2,236,672 | 4/1941 | Coffey et al. | 260/372 |

Primary Examiner—Winston A. Douglas
Assistant Examiner—Raymond K. Covington
Attorney, Agent, or Firm—Cushman, Darby & Cushman

[57] ABSTRACT

Anthraquinone dyes having the formula:

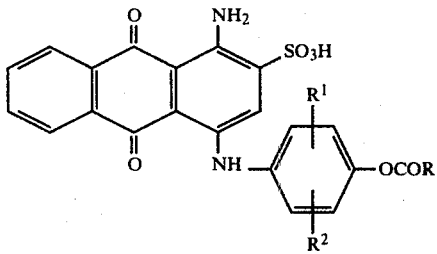

wherein R represents an optionally substituted alkyl, aryl, cycloalkyl, alkoxy, aryloxy or cycloalkoxy radical and each of $R^1$ and $R^2$, independently, represents hydrogen or a $C_{1-4}$ alkyl radical.

The dyes are applicable as acid dyes to natural and synthetic polyamide textiles.

2 Claims, No Drawings

ANTHRAQUINONE DYES

This invention relates to anthraquinone dyes and their application to textile materials.

According to the invention, there are provided anthraquinone dyes which, in the form of the free acids, have the formula:

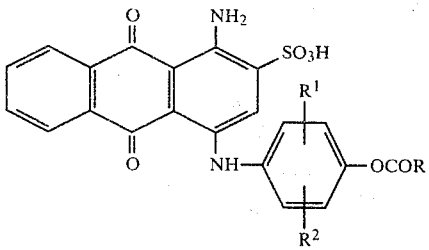

wherein R represents an optionally substituted alkyl, aryl, cycloalkyl, alkoxy, aryloxy or cycloalkoxy radical and each of $R^1$ and $R^2$, independently, represents hydrogen or a $C_{1-4}$ alkyl radical.

Alkyl and alkoxy radicals which may be represented by R preferably contain from one to nine carbon atoms. Examples of substituted alkyl radicals include hydroxyalkyl, carboxyalkyl, alkoxyalkyl, aralkyl and aryloxyalkyl. Optionally substituted aryl and aryloxy radicals which may be represented by R include, in particular, optionally substituted phenyl and phenoxy radicals. Optionally substituted cycloalkyl and cycloalkoxy radicals include optionally substituted cyclohexyl and cyclohexyloxy radicals.

Preferably, R is $C_{1-4}$alkyl and each of $R^1$ and $R^2$ is hydrogen. The dyes of the invention may be prepared by reacting a compound of the formula:

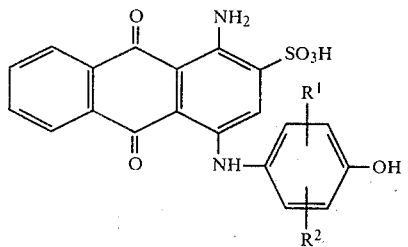

wherein $R^1$ and $R^2$ have the meanings given above, with an acylating agent capable of converting the phenolic —OH group to —OCOR wherein R has the meaning given above.

Suitable acylating agents include the chlorides and anhydrides of carboxylic acids such as acetic, propionic, butyric, glycollic, succinic, methoxyacetic, phenoxyacetic, benzoic, toluic, phenylacetic and cyclohexyl carboxylic acids. Other suitable acylating agents include alkyl, aryl and cycloalkyl chloroformates.

The reaction between the compound of Formula II and the acylating agent is conveniently carried out in aqueous solution, optionally in the presence of a basic catalyst, for example pyridine.

The compounds of Formula II may themselves be prepared, as described in United Kingdom Patent Specification No. 505,546 by reacting 1-amino-4-bromoanthraquinone-2-sulphonic acid with an appropriate p-aminophenol in water, which may contain an organic solvent such as ethanol, in the presence of an alkali and a copper catalyst. Suitable aminophenols include 4-aminophenol, 3-methyl-4-aminophenol, 3-ethyl-4-aminophenol, 2-ethyl-4-aminophenol, 2-methyl-4-aminophenol, 2,3-dimethyl-4-aminophenol, 3,5-dimethyl-4-aminophenol and 2,5-dimethyl-4-aminophenol.

The reactions leading to the formation of the dyes of the invention may be performed using conditions that have been fully described in the prior art for such reactions. Similarly, the dyes may be isolated by known methods and, as in the case of other dyes containing sulphonic acid groups, it is often convenient to isolate and use the dyes in the form of their water-soluble salts, particularly their alkali metal or ammonium salts and especially sodium salts. It is to be understood that the invention relates to both the free acids and their salts.

The dyes of the invention are suitable for applying to polyamide textile materials such as wool and silk but especially to synthetic polyamide textile materials, for example nylon 66 and nylon 6, using any of the general methods known for the application of acid dyes to such materials. The dyes provide blue shades having a high degree of fastness to wet treatments and to light and have better levelling properties than the dyes containing sulphonic acid ester groups described in United Kingdom Patent Specification No. 505,546.

The invention is illustrated but not limited by the following Examples in which all parts and percentages are by weight.

EXAMPLE 1

1.5 parts of 1-amino-4-(4'-hydroxyanilino)anthraquinone-2-sulphonic acid (sodium salt), prepared as described in UK Pat. No. 505,546, are dissolved in 70 parts of water with the aid of a few drops of 32% sodium hydroxide solution at 25° C. 2 parts of acetic anhydride are added dropwise followed by 2 parts of pyridine. After 2 hours the reaction is complete as indicated by thin-layer chromatography. The product is filtered off, washed with 5% brine and dried at 60° C. The product dyes polyamide materials in bright blue shades possessing good fastness to washing and to light.

EXAMPLE 2

1.5 parts of 1-amino-4-(4'-hydroxyanilino)anthraquinone-2-sulphonic acid (sodium salt) are dissolved in 70 parts of water as described in Example 1. 1.5 parts of benzoic anhydride are added slowly followed by 2 parts of pyridine. The mixture is heated to 50°-55° C. for 2 hours, after which acylation is complete as determined by TLC. The precipitated product is filtered off, washed with a little water and dried. The product dyes polyamide materials in bright blue shades possessing excellent fastness to washing and to light.

EXAMPLE 3

When 1.5 parts of propionic anhydride are used in place of the benzoic anhydride used in Example 2, the acylation is complete in ½ hour at 25° C. The product is isolated from the reaction medium by the addition of 5% chloride solution, filtered off, and washed with 5% brine. The product dyes polyamide materials in bright blue shades possessing excellent fastness to washing and to light, and excellent levelling properties.

EXAMPLE 4

1.5 parts of ethyl chloroformate are added dropwise at 25° C. to a solution of 5 parts of 1-amino-4-(4'- hydroxyanilino)anthraquinone-2-sulphonic acid in 100 parts of water, maintaining the PH of the mixture at 9.5 to 10 by the dropwise addition of 10% sodium hydroxide solution. The mixture is heated to 50° C. and stirred for 1 hour. The reaction was complete as judged by TLC. The mixture is cooled, and the product precipitated by the addition of 5% of sodium chloride. The dyestuff is filtered off, washed with 5% brine and dried. The product dyes polyamide materials in bright blue shades possessing excellent fastness properties.

In a similar manner the anthraquinone compound in column A of the Table is reacted with the acylating agent named in B to give the corresponding acyloxy derivative of general formula I. Each of the products dyes polyamide textile materials in fast blue shades.

TABLE

| Example | A | B |
|---|---|---|
| 5 | 1-Amino-4-(2'-ethyl-4'-hydroxyanilino)anthraquinone-2-sulphonic acid | Propionic anhydride |
| 6 | 1-Amino-4-(2'-ethyl-4'-hydroxyanilino)anthraquinone-2-sulphonic acid | Phenoxyacetic anhydride |
| 7 | 1-Amino-4-(2'-ethyl-4'-hydroxyanilino)anthraquinone-2-sulphonic acid | Phenylacetyl chloride |
| 8 | 1-Amino-4-(2'-methyl-4'-hydroxyanilino)anthraquinone-2-sulphonic acid | 2-methyl cyclohexyl chloroformate |
| 9 | 1-Amino-4-(2'-methyl-4'-hydroxyanilino)anthraquinone-2-sulphonic acid | Benzoyl chloride |
| 10 | 1-Amino-4-(2'-methyl-4'-hydroxyanilino)anthraquinone-2-sulphonic acid | 3-methyl cyclohexyl chloroformate |
| 11 | 1-Amino-4-(4'-hydroxyanilino)anthraquinone-2-sulphonic acid | Succinic anhydride |
| 12 | 1-Amino-4(4'-hydroxyanilino)anthraquinone-2-sulphonic acid | methoxyacetic anhydride |
| 13 | 1-Amino-4-(4'-hydroxyanilino)anthraquinone-2-sulphonic acid | Phenyl chloroformate |
| 14 | 1-Amino-4-(4'-hydroxyanilino)anthraquinone-2-sulphonic acid | Phenylacetyl chloride |
| 15 | 1-Amino-4-(4'-hydroxyanilino)anthraquinone-2-sulphonic acid | 3-methyl cyclohexyl chloroformate |
| 16 | 1-Amino-4-(3'-methyl-4'-hydroxyanilino)anthraquinone-2-sulphonic acid | Propionyl chloride |
| 17 | 1-Amino-4-(3'-methyl-4'-hydroxyanilino)anthraquinone-2-sulphonic acid | 4'-methyl cyclohexyl chloroformate |
| 18 | 1-Amino-4-(2',3'-dimethyl-4'-hydroxyanilino)anthraquinone-2-sulphonic acid | Acetic anhydride |
| 19 | 1-Amino-4-(2',3'-dimethyl-4'-hydroxyanilino)anthraquinone-2-sulphonic acid | Glycollic anhydride |
| 20 | 1-Amino-4-(2',5'-dimethyl-4'-hydroxyanilino)antraquinone-2-sulphonic acid | Acetic anhydride |
| 21 | 1-Amino-4-(2',5'-dimethyl-4'-hydroxyanilino)anthraquinone-2-sulphonic acid | Succinic anhydride |
| 22 | 1-Amino-4-(2',5'-dimethyl-4'-hydroxyanilino)anthraquinone-2-sulphonic acid | Cyclohexyl chloroformate |
| 23 | 1-Amino-4-(2',5'-dimethyl-4'-hydroxyanilino)anthraquinone-2-sulphonic acid | 2'-methyl cyclohexyl chloroformate |
| 24 | 1-Amino-4-(2',5'-dimethyl-4'-hydroxyanilino)anthraquinone-2-sulphonic acid | Benzoyl chloride |
| 25 | 1-Amino-4-(2',5'-dimethyl-4'-hydroxyanilino)anthraquinone-2-sulphonic acid | Phenylacetic anhydride |
| 26 | 1-Amino-4-(2',5'-dimethyl-4'-hydroxyanilino)anthraquinone-2-sulphonic acid | Butyric anhydride |

I claim:

1. An anthraquinone dye which, in the form of the free acid, has the formula:

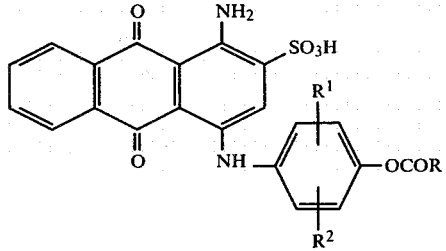

wherein R represents lower alkyl, hydroxy lower alkyl, carboxy lower alkyl, lower alkoxy lower alkyl, phenyl lower alkyl, phenoxy lower alkyl, phenyl, lower alkoxy, phenoxy, cyclohexyloxy or methylcyclohexyloxy and each of $R^1$ and $R^2$, independently, represents hydrogen or a lower alkyl radical.

2. An anthraquinone dye as claimed in claim 1 wherein R is lower alkyl and each of $R^1$ and $R^2$ is hydrogen.

* * * * *